United States Patent
Ohfuku

(10) Patent No.: US 9,091,880 B2
(45) Date of Patent: Jul. 28, 2015

(54) LIQUID CRYSTAL DISPLAY DEVICE HAVING MOVABLE REFLECTING AND TRANSMITTING SCREEN

(75) Inventor: Kazuki Ohfuku, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 133 days.

(21) Appl. No.: 13/878,066

(22) PCT Filed: Oct. 12, 2011

(86) PCT No.: PCT/JP2011/073364
§ 371 (c)(1),
(2), (4) Date: Apr. 5, 2013

(87) PCT Pub. No.: WO2012/053397
PCT Pub. Date: Apr. 26, 2012

(65) Prior Publication Data
US 2013/0201428 A1 Aug. 8, 2013

(30) Foreign Application Priority Data

Oct. 19, 2010 (JP) ................................. 2010-234805

(51) Int. Cl.
*G02F 1/1335* (2006.01)
*F21V 8/00* (2006.01)

(52) U.S. Cl.
CPC ........ *G02F 1/133524* (2013.01); *G02B 6/0055* (2013.01); *G02F 1/133605* (2013.01); *G02F 1/133555* (2013.01); *G02F 2203/62* (2013.01)

(58) Field of Classification Search
CPC ....... G02B 6/00; G02B 6/0055; G02B 6/0083
USPC ................................................ 349/65, 61, 67
See application file for complete search history.

(56) References Cited

U.S. PATENT DOCUMENTS

| | | | |
|---|---|---|---|
| 6,561,506 B2 * | 5/2003 | Sasaki et al. .................. | 271/145 |
| 6,727,966 B2 * | 4/2004 | Tanaka ........................... | 349/114 |
| 2004/0209682 A1 | 10/2004 | Okada | |
| 2008/0230979 A1 * | 9/2008 | Asada et al. .................. | 271/121 |
| 2009/0316069 A1 * | 12/2009 | Kimura et al. .................. | 349/61 |
| 2013/0016134 A1 * | 1/2013 | Hoshino ....................... | 345/690 |

FOREIGN PATENT DOCUMENTS

| | | |
|---|---|---|
| JP | 10-062781 A | 3/1998 |
| JP | 3902132 B2 | 4/2007 |

\* cited by examiner

*Primary Examiner* — Richard Kim
(74) *Attorney, Agent, or Firm* — Chen Yoshimura LLP

(57) ABSTRACT

A liquid crystal display device is provided with: a liquid crystal display panel (10), a light guide plate disposed on the rear surface side of the liquid crystal display panel; light sources disposed on the side surfaces of the light guide plate and applying light to the liquid crystal display panel through the light guide plate; a reflective sheet (60) disposed on the rear surface side of the light guide plate; and a reflection sheet moving unit (65) that movably holds the reflection sheet.

12 Claims, 9 Drawing Sheets

LIQUID CRYSTAL DISPLAY DEVICE HAVING MOVABLE REFLECTING AND TRANSMITTING SCREEN

TECHNICAL FIELD

The present invention relates to a liquid crystal display device provided with a liquid crystal display panel. More particularly, the present invention relates to a structure for providing a reflective sheet that is disposed on a rear surface side of a liquid crystal display panel.

This application claims the benefit of Japanese Patent Application No. 2010-234805, filed in Japan on Oct. 19, 2010, which is hereby incorporated by reference in its entirety.

BACKGROUND ART

Examples of the application of liquid crystal display panels include amusement products and digital signage. In those applications, a liquid crystal display device is configured such that an image is displayed on a liquid crystal display panel thereof and an object placed behind the liquid crystal display device can be viewed from the front side of the liquid crystal display panel. Patent Document 1 discloses a technique relating to such a display configuration, in which an opening is formed in a portion of a component that has a low transparency such as a reflective sheet of a liquid crystal display device, and through the opening, an object placed behind the liquid crystal display device can be viewed from the front side of the liquid crystal display device.

RELATED ART DOCUMENT

Patent Document

Patent Document 1: Japanese Patent No. 3902132

SUMMARY OF THE INVENTION

Problems to be Solved by the Invention

However, while the conventional technique described above makes it possible to view the object placed behind the liquid crystal display device from the front side through the opening, because the reflective sheet is not provided in the opening, it affects image display in the liquid crystal display panel in a location corresponding to the opening. On the other hand, because the reflective sheet is present in other areas than the opening, images are displayed in a desired manner, but in those areas, it is not possible to view an object placed in the rear. That is, in the liquid crystal display panel, a region in which images are displayed and a region in which an object in the rear can be viewed are fixed, and could not be moved.

The present invention was made in view of such a problem in the conventional configuration, and an object thereof is to provide a liquid crystal display device that can freely move positions of an image display region and a region where an object in the rear can be viewed in a liquid crystal display panel.

Means for Solving the Problems

In order to achieve the above object, the present invention provides a liquid crystal display device. That is, a liquid crystal display device according to the present invention includes: a liquid crystal display panel; a light guide plate disposed on a rear surface side of the liquid crystal display panel; a light source disposed at a side face of the light guide plate, the light source emitting light to a display region of the liquid crystal display panel through the light guide plate; a reflective sheet placed on a rear surface side of the light guide plate; and a reflective sheet moving unit that moves and holds the reflective sheet.

The liquid crystal display device provided by the present invention includes a reflective sheet moving unit that movably holds a reflective sheet, and by the reflective sheet moving unit, it is possible to change the position of the reflective sheet behind the light guide plate (that is, behind the display region of the liquid crystal display panel).

With this configuration, when the reflective sheet is moved and placed behind the display region of the liquid crystal display panel, images can be displayed in a desired manner without any problems in a region of the liquid crystal display panel where the reflective sheet is placed. On the other hand, when the reflective sheet is moved so as not to be disposed behind the display region in the liquid crystal display panel, in the region of the liquid crystal display panel where the reflective sheet is not disposed, an object placed behind the liquid crystal display device can be viewed.

As described above, according to the present invention, by having the reflective sheet moving unit that moves the reflective sheet disposed behind the light guide plate, it is possible to freely change the positions of an image display region and a region where an object placed behind the liquid crystal display device can be viewed.

In a preferred embodiment of the liquid crystal display device disclosed herein, the reflective sheet has a reflective portion and a transmissive portion, the reflective portion reflecting light emitted from the light guide plate back to the light guide plate with a relatively high reflectance, the transmissive portion being made of a material that has a relatively low reflectance or that does not reflect the light and having a relatively high transmittance of light emitted from the light guide plate. The reflective sheet moving unit is configured to be able to change the positions of the reflective portion and the transmissive portion behind the display region of the liquid crystal display panel.

With this configuration, when the reflective sheet moving unit moves the respective sheet so as to dispose the reflective portion behind the display region of the liquid crystal display panel, in the region where the reflective portion is disposed, light emitted from the light guide plate is reflected toward the liquid crystal display panel. Therefore, in such a region of the liquid crystal display panel, it is possible to display images in a desired manner. On the other hand, when the reflective sheet is moved so as to dispose the transmissive portion behind the display region of the liquid crystal display panel, in the region where the transmissive portion is disposed, a part with a low transparency does not exist, and therefore, light is transmitted. As a result, an object placed behind the liquid crystal display device can be viewed through the above-mentioned region of the liquid crystal display panel.

In another preferred embodiment of the liquid crystal display device disclosed herein, each of the reflective portion and the transmissive portion of the reflective sheet has an area that is equal to or greater than the area of the display region of the liquid crystal display panel. The reflective sheet moving unit can switch positions of the reflective portion and the transmissive portion behind the display region of the liquid crystal display panel.

In the liquid crystal display device configured in the manner described above, each of the reflective portion and the transmissive portion of the reflective sheet has an area equal to or greater than the area of the display region of the liquid crystal display panel. Therefore, when the reflective sheet moving unit moves the reflective sheet to cover the rear surface side of the display region of the liquid crystal display panel with the reflective portion, image display is not interfered, and desired image display can be achieved in the entire display region (entire screen) of the liquid crystal display panel. On the other hand, by covering the rear surface side of the display region of the liquid crystal display panel with the transmissive portion, a part with a low transparency is removed from the entire display region (entire screen) of the liquid crystal display panel, which allows an object placed behind the liquid crystal display panel to be viewed.

In another preferred embodiment of the liquid crystal display device disclosed herein, the reflective sheet is formed to be large enough to completely cover the display region of the liquid crystal display panel. The reflective sheet moving unit has roll-up spindles that can roll up respective ends of the reflective sheet in a prescribed direction (typically the longitudinal direction or the shorter side direction). By rotating each of the roll-up spindles, the reflective sheet is moved in the prescribed direction, and the positions of the reflective portion and the transmissive portion behind the display region of the liquid crystal display panel can be moved.

With this configuration, on the rear surface side of the display region of the liquid crystal display panel, the positions of the reflective portion and the transmissive portion can be moved with ease by moving the reflective sheet by the reflective sheet moving unit. Also, because the reflective sheet is rolled up by the roll-up spindle, a storage space for the reflective sheet can be made small.

In another preferred embodiment of the liquid crystal display device disclosed herein, the reflective sheet is formed in a rectangular shape, and an edge along at least one side of the sheet has recesses and protrusions. The reflective sheet moving unit is provided with a gear that can engage with the recesses and protrusions on the edge, and by rotating the gear, the reflective sheet is moved reversibly in a direction in which the edge with recesses and protrusions is extended. As a result, the positions of the reflective portion and the transmissive portion behind the display region of the liquid crystal display panel can be moved.

With this configuration, on the rear surface side of the display region of the liquid crystal display panel, the positions of the reflective portion and the transmissive portion can be moved with ease by moving the reflective sheet by the reflective sheet moving unit.

In another preferred embodiment, the liquid crystal display device disclosed herein further includes at least one optical sheet and an optical sheet moving unit that movably holds the optical sheet between the liquid crystal display panel and the light guide plate. The optical sheet moving unit can move the position of the optical sheet in synchronization with a positional change of the reflective sheet.

With this configuration, the optical sheet is moved in synchronization with the reflective sheet. When the reflective sheet is moved and placed behind the display region of the liquid crystal display panel, the optical sheet is moved and placed in a position that corresponds to the front side of the reflective sheet. The optical sheet enhances light utilization, and can therefore improve the brightness, prevent unevenness in display, and the like in the liquid crystal display panel. Thus, it is possible to improve the image display quality in the image display region of the liquid crystal display panel. On the other hand, when the reflective sheet is moved so as not to be disposed behind the display region of the liquid crystal display panel, the optical sheet is moved and placed in a position that corresponds to the front side of the reflective sheet. That is, the optical sheet is not disposed behind the display region, and a part with a low transparency does not exist therein. Therefore, in the above-mentioned region of the liquid crystal display panel, an object placed behind the liquid crystal display device can be viewed.

In another preferred embodiment of the liquid crystal display device disclosed herein, the optical sheet has an angle deflection portion and a transparent portion, the angle deflection portion changing an angle of light emitted from the light guide plate and emitting the light to the liquid crystal display panel, the transparent portion having a relatively high transmittance of light emitted from the light guide plate. The optical sheet moving unit is configured such that the angle deflection portion is placed in a position corresponding to the front side of the reflective portion of the reflective sheet, and such that the transparent portion is placed in a position corresponding to the front side of the transmissive portion of the reflective sheet. The optical sheet moving unit can change the positions of the angle deflection portion and the transparent portion in synchronization with positional changes of the reflective portion and the transmissive portion.

With this configuration, when the reflective sheet moving unit moves the reflective sheet such that the reflective portion is disposed behind the display region of the liquid crystal display panel, the optical sheet moving unit moves the optical sheet in synchronization with the move of the reflective sheet, and therefore, the angle deflection portion is placed in a position corresponding to the front side of the reflective portion. As a result, the liquid crystal display panel can perform higher-quality image display in the region where the reflective portion and the angle deflection portion are placed. On the other hand, when the reflective sheet moving unit moves the reflective sheet such that the transmissive portion is disposed behind the display region of the liquid crystal display panel, the optical sheet is moved in synchronization with the move of the reflective sheet, and therefore, the transparent portion is placed in a position corresponding to the front side of the transmissive portion. Thus, in the liquid crystal display panel, a part with a low transparency does not exist in the region where the transmissive portion and the transparent portion are disposed. This allows an object placed behind the liquid crystal display device to be viewed in the above-mentioned region of the liquid crystal display panel.

In another preferred embodiment of the liquid crystal display device disclosed herein, the optical sheet is formed to be large enough to completely cover the display region of the liquid crystal display panel. The optical sheet moving unit has roll-up spindles that can roll up respective ends of the optical sheet in a prescribed direction (typically, longitudinal direction or shorter side direction). By rotating each of the roll-up spindles, the optical sheet is moved in the prescribed direction, and the positions of the angle deflection portion and the transparent portion behind the display region of the liquid crystal display panel can be changed.

With this configuration, on the rear surface side of the display region of the liquid crystal display panel, the positions of the angle deflection portion and the transparent portion can be changed with ease by moving the optical sheet by the optical sheet moving unit. Also, because the optical sheet is rolled up by the roll-up spindles, a storage space for the optical sheet can be made small.

In another preferred embodiment of the liquid crystal display device disclosed herein, the optical sheet is formed in a quadrangular shape, and an edge along at least one side of the sheet has recesses and protrusions. The optical sheet moving unit is provided with a gear that can engage with the recesses and protrusions on the edge, and by rotating the gear, the optical sheet is moved reversibly in a direction in which the edge with recesses and protrusions is extended. As a result, the positions of the angle deflection portion and the transparent portion behind the display region of the liquid crystal display panel can be changed.

With this configuration, on the rear surface side of the display region of the liquid crystal display panel, the positions of the angle deflection portion and the transparent portion can be changed with ease by moving the optical sheet by the optical sheet moving unit.

In another preferred embodiment of the liquid crystal display device disclosed herein, the reflective sheet moving unit and the optical sheet moving unit are driven by the same driving source.

With this configuration, the reflective sheet and the optical sheet can be moved at the same time in synchronization with each other by a simple structure.

DETAILED DESCRIPTION OF EMBODIMENTS

Below, preferred embodiments of the present invention will be explained with reference to figures. Matters not specifically mentioned herein, but necessary to implement the present invention can be worked out as design matter by those skilled in the art based on conventional technologies in the field. The present invention can be implemented based on the contents disclosed herein and common technical knowledge in the field.

Figure 1:
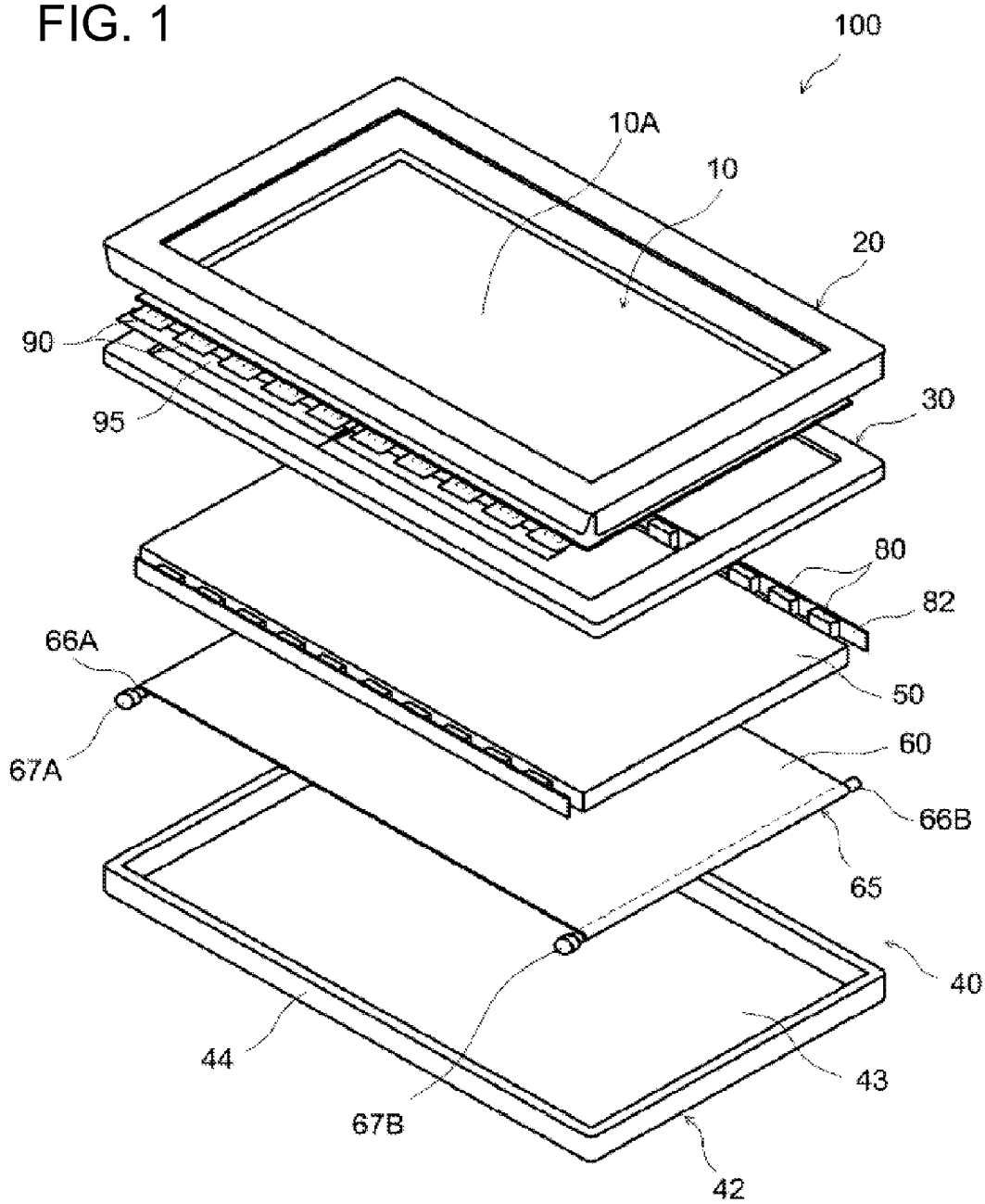
FIG. 1 is an exploded perspective view that schematically shows a structure of a liquid crystal display device of one embodiment.
Figure 2:
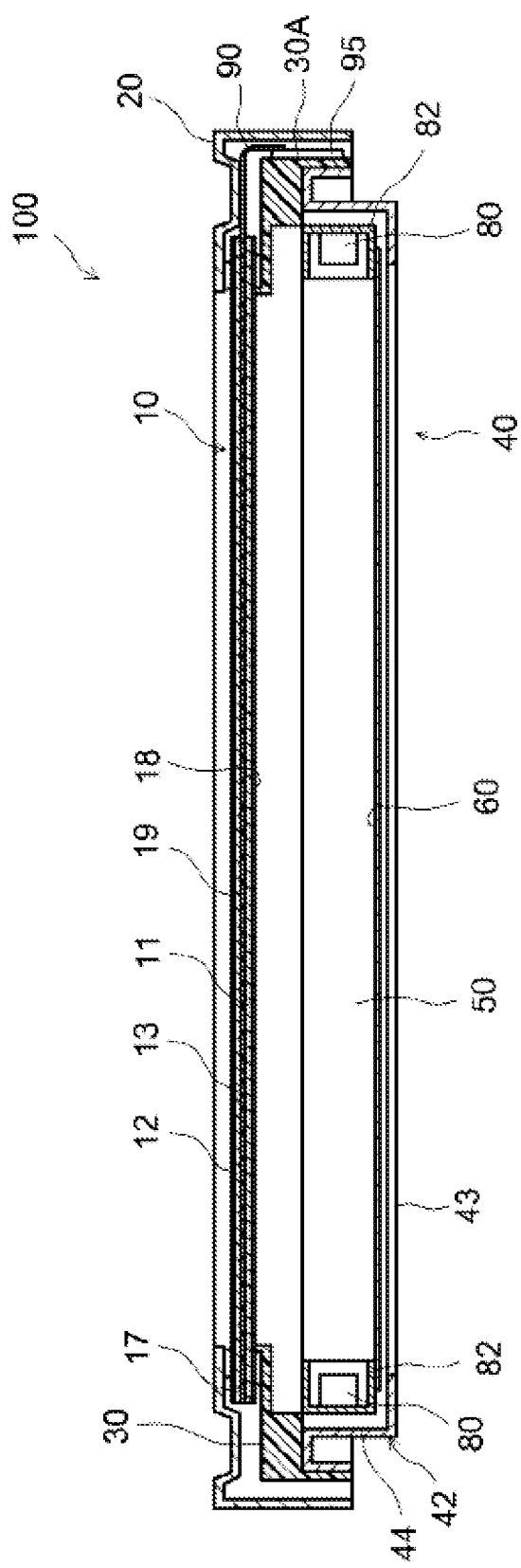
FIG. 2 is a cross-sectional view that schematically shows a structure of a liquid crystal display device of one embodiment.

Below, with reference to FIGS. 1 to 4, a preferred embodiment (Embodiment 1) of the present invention will be explained. In the example below, an active matrix type (TFT-type) liquid crystal display device 100 that includes a liquid crystal display panel 10 as a display panel will be explained. FIG. 1 is an exploded perspective view that schematically shows a structure of the liquid crystal display device 100 of the present embodiment. FIG. 2 is a cross-sectional view that schematically shows a structure of the liquid crystal display device 100 of the present embodiment.

In the following figures, the same reference characters are given to members and portions that have the same functions, and duplicative explanations may be omitted or abridged. Also, the dimensional relationship (length, width, thickness, and the like) in each of the figures does not necessarily reflect the actual dimensional relationship accurately. In the description below, "front surface" or "front side" refers to a side facing a viewer of the liquid crystal display device 100 (that is, the side of the liquid crystal display panel), and "rear surface" or "rear side" refers to a side not facing the viewer of the liquid crystal display device 100 (that is, the side of a backlight device 40).

First, an overall configuration of the liquid crystal display device 100 will be explained. As shown in FIG. 1, the liquid crystal display device 100 includes a liquid crystal display panel 10 and a backlight device 40 that is an external light source disposed on the rear surface side of the liquid crystal display panel 10. The liquid crystal display panel 10 and the backlight device 40 are assembled by a bezel (frame member) 20 or the like, thereby being held as one component.

As shown in FIG. 1, the liquid crystal display panel 10 typically has a rectangular shape as a whole, and has a display region 10A in the center thereof. The display region 10A has pixels formed therein, and displays images. As shown in FIG. 2, the liquid crystal display panel 10 has a sandwich structure made of a pair of transparent glass substrates 11, 12 facing each other, and a liquid crystal layer 13 sealed therebetween. Of the pair of substrates 11 and 12, one on the front side is a color filter substrate (CF substrate) 12, and the other on the rear side is an array substrate 11. In the periphery of the CF substrate 12 and the array substrate 11, a sealing member 17 is provided so as to enclose the display region, thereby sealing the liquid crystal layer 13. The liquid crystal layer 13 is made of a liquid crystal material that includes liquid crystal molecules. The orientation of the liquid crystal molecules is controlled by an electric field applied between the array substrate 11 and the CF substrate 12, which changes the optical characteristics of the liquid crystal material. The respective substrates 11 and 12 have alignment films (not shown) that respectively determine the orientation directions of the liquid crystal molecules on the respective surfaces facing each other (inner surfaces). On the respective surfaces not facing each other (outer surfaces), polarization plates 18 and 19 are respectively bonded.

In the liquid crystal display panel 10 disclosed herein, on the front side (side facing the liquid crystal layer 13) of the array substrate 11, pixels (not shown) for displaying an image are arranged, and a plurality of not-shown source wiring lines and gate wiring lines for driving the respective pixels (sub-pixels) are formed in a grid pattern. In each grid enclosed by such wiring lines, a (sub) pixel electrode and a thin film transistor (TFT), which is a switching element, are provided. The pixel electrode is typically made of ITO (indium tin oxide), which is a transparent conductive material. Voltages corresponding to an image are supplied to these pixel electrodes at a prescribed timing through the source wiring lines and the thin film transistors.

On the other hand, the CF substrate 12 has color filters (not shown) of R (red), G (green), B (blue), and Y (yellow), each of which faces one pixel electrode of the array substrate 11. The CF substrate 12 also has a black matrix that borders the color filters of the respective colors, and an opposite electrode (transparent electrode) that is uniformly deposited over the color filters and the black matrix.

The array substrate 11 is formed to be larger than the CF substrate 12. When the two substrates 11 and 12 are bonded to each other, an edge of at least one side of the four sides that constitute a rectangular periphery of the array substrate 11 slightly protrudes from the CF substrate 12. As shown in FIGS. 1 and 2, in the protruding edge, flexible printed circuits (FPCs) 90 are disposed. On each FPC 90, a not-shown liquid crystal display panel driver IC chip (driver IC chip) for driving the liquid crystal display panel 10 is mounted. In the FPC 90 configured in the manner described above, one end thereof is fixed to the protruding edge so as to connect the FPC 90 to the electrodes (the pixel electrodes, opposite electrode, and the like) in the liquid crystal display panel 10. The other end of the FPC 90 is attached to a printed board (wiring board) 95 in which a controller for the driver ICs (chips), other electronic components, and the like are incorporated. As shown in FIG. 2, the printed board 95 is folded toward the backlight device 40, and is thereby disposed at the side face portion of the backlight device 40 (more specifically, the side face portion 30A on the periphery of the frame 30). The printed board 95 may also be disposed on the rear side of the backlight device 40.

As shown in FIG. 1, the liquid crystal display panel 10 of the present embodiment is configured such that a plurality of FPCs 90 are fixed to the edge of one side of the four sides that constitute the rectangular periphery of the array substrate 11, but alternatively, FPCs may be disposed along two sides, three sides, or four sides of the periphery of the array substrate 11.

As shown in FIG. 2, the backlight device 40 of the present embodiment that is disposed on the rear surface side (rear side) of the liquid crystal display panel 10 is generally provided with light sources 80, a light guide plate 50 that converts light from the light sources 80 to planar light, a reflective sheet 60, and a chassis (backlight chassis, also referred to as a case) 42 that houses these components.

As shown in FIGS. 1 and 2, the chassis 42 is constituted of a quadrangular (typically, rectangular) bottom surface 43 and a frame-shaped side wall portion 44 that is formed so as to enclose the bottom surface 43, and is formed in a box shape that has an opening on the front side. In the bottom surface 43, a portion thereof that corresponds to the display region 10A of the liquid crystal display panel 10 is made of a material that has a high light transmittance (acrylic resin, for example), or the portion is cut out to form an opening.

The light guide plate 50 is formed by injection forming or the like in a rectangular flat plate shape that is large enough to cover the display region 10A of the liquid crystal display panel 10. There is no special limitation on the material to form the light guide plate 50 as long as it has a transparency and an excellent formability. Examples of the material include an acrylic resin and a polycarbonate resin. On the bottom surface of the light guide plate 50 (rear surface facing the reflective sheet 60), a dotted pattern (not shown) or the like is formed so as to increase the light utilization efficiency by scattering light. Also, as shown in FIGS. 1 and 2, a plurality of light sources 80 are disposed along the sides the light guide plate 50 (in the vicinity of respective end faces) at positions opposite to each other. Examples of the light sources 80 include LEDs and linear fluorescent lamps (typically, cold cathode fluorescent lamps). As shown in FIG. 2, the light sources 80 are covered by a reflector (reflective film) 82 such that light from the light sources 80 efficiently enters the light guide plate 50. The light sources 80 are not necessarily disposed along the two sides of the light guide plate 50 so as to face each other, and may be disposed along only one side of the light guide plate.

Light that entered the light guide plate 50 from the light sources 80 is diffused and propagated through the light guide plate 50, and is emitted through the surface of the light guide plate 50 facing the liquid crystal display panel 10 toward the panel 10. Of the light that entered the light guide plate 50, light that exited through the surface of the light guide plate 50 facing the chassis 42 toward the reflective sheet 60 is reflected back to the light guide plate 50 by a reflective portion 61 of the reflective sheet 60, which will be later described, when the reflective portion 61 is disposed behind the light guide plate 50.

Figure 3:
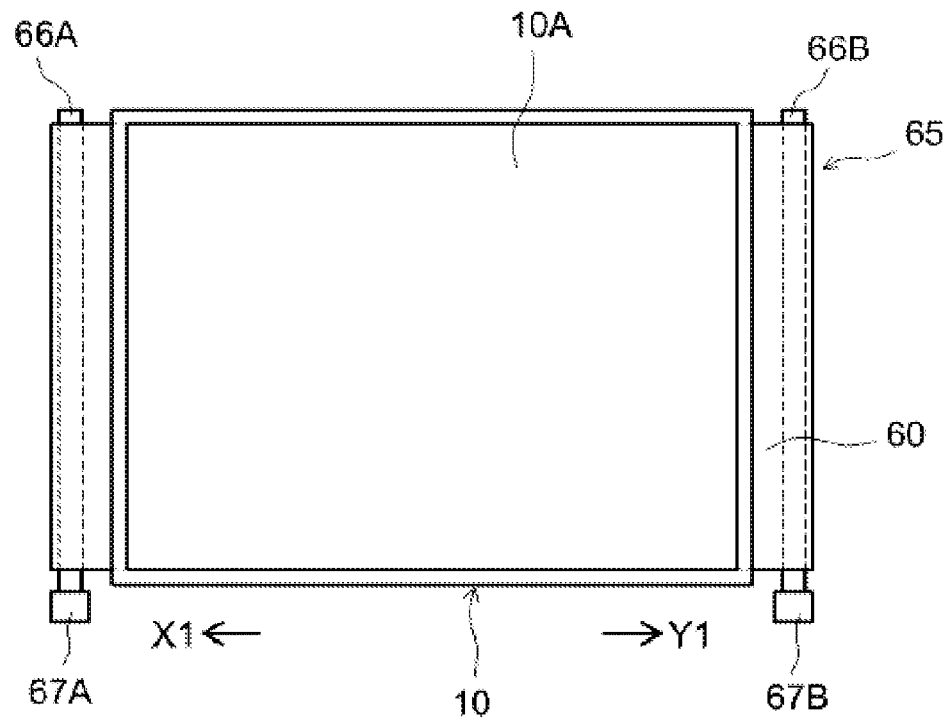
FIG. 3 is a front view that schematically shows a structure of a liquid crystal display panel and a reflective sheet moving unit of one embodiment.

Next, the reflective sheet 60 and a reflective sheet moving unit 65 will be explained. FIG. 3 is a front view that schematically shows a structure of the liquid crystal display panel 10 and the reflective sheet moving unit 65 of the present embodiment. In FIG. 3, the bezel 20 or the chassis 42 is not shown for simplification.

Figure 4:
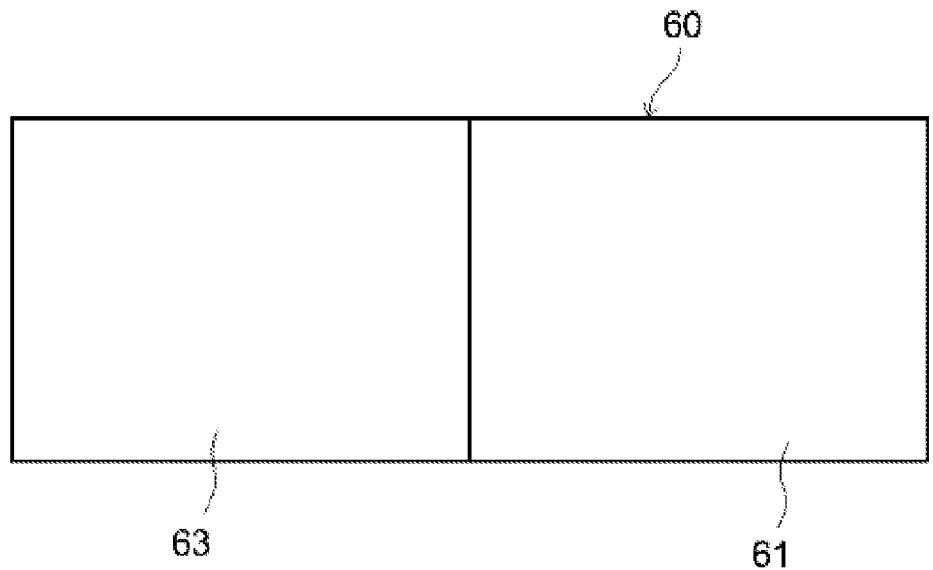
FIG. 4 is a plan view that schematically shows a structure of a reflective sheet of one embodiment.

As shown in FIGS. 1 and 3, the reflective sheet 60 is formed to be large enough to completely cover the display region 10A of the liquid crystal display panel 10, and is disposed on the rear surface side of the light guide plate 50. As shown in FIG. 4, the reflective sheet 60 is formed in a band shape, and has a reflective portion 61 and a transmissive portion 63. The reflective portion 61 has a relatively high reflectance in reflecting light emitted from the light guide plate 50 (see FIG. 2) back to the light guide plate 50 (below, simply referred to as "reflectance"). In the transmissive portion 63, the reflectance is relatively low or the light is not reflected, while the transmittance of light emitted from the light guide plate 50 is relatively high. It is preferable that each of the reflective portion 61 and the transmissive portion 63 have an area that is equal to or greater than the area of the display region 10A of the liquid crystal display panel 10. With this configuration, it is possible to cover the entire rear surface side of the display region 10A of the liquid crystal display panel 10 with the reflective portion 61 or the transmissive portion 63. In this embodiment, the reflective portion 61 and the transmissive portion 63 of the reflective sheet 60 respectively have a larger area than that of the display region 10A of the liquid crystal display panel 10.

There is no special limitation on the material to form the reflective portion 61 as long as it absorbs little light and has a high reflectance. Examples of the material include a diffuse reflection type white polyester film (pigment added), and ultra-white polyester film. It is also possible to use a mirror reflection type thin film made by sputtering silver (Ag) onto the polyester film and the like. There is no special limitation on the material to form the transmissive portion 63 as long as it absorbs and diffuses little light and has a high transmittance. Examples of the material include polyethylene terephthalate (PET), polyethylene (PE), and polypropylene (PP). Alternatively, the transmissive portion 63 may be formed by cutting out a portion of the reflective portion 61. Examples thereof include cutting out the reflective portion 61 leaving only the periphery thereof, and forming a plurality of penetrating holes in the reflective portion 61.

As shown in FIGS. 1 and 3, the reflective sheet moving unit 65 holds the reflective sheet 60 so as to be able to move, and has roll-up spindles 66A and 66B that can roll up respective end portions of the reflective sheet 60 in a prescribed direction (typically, longitudinal direction or shorter side direction; in this embodiment, longitudinal direction). As shown in FIG. 3, the reflective sheet roll-up spindles 66A and 66B are disposed near the respective ends of the liquid crystal display panel 10 in the longitudinal direction. At one end of the reflective sheet roll-up spindle 66A, an electric motor (stepping motor, for example) 67A is provided as a driving source for driving the reflective sheet roll-up spindle 66A. Similarly, at one end of the reflective sheet roll-up spindle 66B, an electric motor 67B is provided. It is preferable to use electric motors that can drive in both forward and reverse directions as the electric motors 67A and 67B. The reflective sheet moving unit 65 (reflective sheet roll-up spindles 66A and 66B and electric motors 67A and 67B) of the present embodiment is housed in the chassis 42, and is fixed to each side wall portion 44 of the chassis 42.

Next, a typical example of moving the reflective sheet 60 in the liquid crystal display device 100 disclosed herein will be explained.

As shown in FIG. 3, both ends of the reflective sheet 60 in the longitudinal direction are respectively attached to the reflective sheet roll-up spindles 66A and 66B. Here, of the electric motors 67A and 67B, at least the electric motor 67A is driven in the forward direction, thereby rotating the reflective sheet roll-up spindle 66A in the forward direction. As a result, the reflective sheet 60 is rolled up by the reflective sheet roll-up spindle 66A, and is moved in the direction of the arrow X1 of FIG. 3. With the move of the reflective sheet 60, the positions of the reflective portion 61 and the transmissive portion 63 behind the display region 10A of the liquid crystal display panel 10 are changed. For example, by continuously moving the reflective sheet 60 in the direction of the arrow X1, only the reflective portion 61 can be disposed behind the display region 10A. As described, by moving the reflective sheet 60 by the reflective sheet moving unit 65 so as to place only the reflective portion 61 behind the display region 10A, the light utilization efficiency can be improved in the entire display region 10A of the liquid crystal display panel 10, which makes possible high-quality image display.

On the other hand, of the electric motors 67A and 67B, at least the electric motor 67B is driven in the reverse direction, thereby rotating the reflective sheet roll-up spindle 66B in the reverse direction. As a result, the reflective sheet 60 is rolled up by the reflective sheet roll-up spindle 66B, and is moved in the direction of the arrow Y1 of FIG. 3. With the move of the reflective sheet 60, the positions of the reflective portion 61 and the transmissive portion 63 behind the display region 10A of the liquid crystal display panel 10 are changed. For example, by continuously moving the reflective sheet 60 in the direction of the arrow Y1, only the transmissive portion 63 can be disposed behind the display region 10A. In this manner, by moving the reflective sheet 60 by the reflective sheet moving unit 65 so as to dispose only the transmissive portion 63 behind the display region 10A, a part with a low transparency (that is, the reflective portion 61) is removed from the entire display region 10A of the liquid crystal display panel 10. Therefore, in the entire display region 10A, an object placed behind the liquid crystal display device 100 can be viewed.

By moving the reflective sheet 60 by the reflective sheet moving unit 65, the reflective portion 61 and the transmissive portion 63 can be placed in desired positions behind the display region 10A. For example, it is possible to dispose the transmissive portion 63 in the left half (the side closer to the reflective sheet roll-up spindle 66A of FIG. 3) of the display region 10A of the liquid crystal display panel 10, and to dispose the reflective portion 61 in the right half (the side closer to the reflective sheet roll-up spindle 66B of FIG. 3) of the display region 10A of the liquid crystal display panel 10. This way, high-quality image display can be performed in the left half region of the display region 10A, and in the right half region, an object placed behind the liquid crystal display device 100 can be viewed.

In the reflective sheet moving unit 65 of the present embodiment, the reflective sheet roll-up spindles 66A and 66B are provided at both ends of the reflective sheet 60 in the longitudinal direction (horizontal direction) such that the reflective sheet 60 can be moved in the longitudinal direction (that is, the longitudinal direction of the liquid crystal display panel 10). Alternatively, the reflective sheet moving unit 65 may be configured to have reflective sheet roll-up spindles on both ends in the shorter side direction (vertical direction) such that the reflective sheet 60 can be moved in the shorter side direction (that is, the shorter side direction of the liquid crystal display panel 10).

Figure 5:
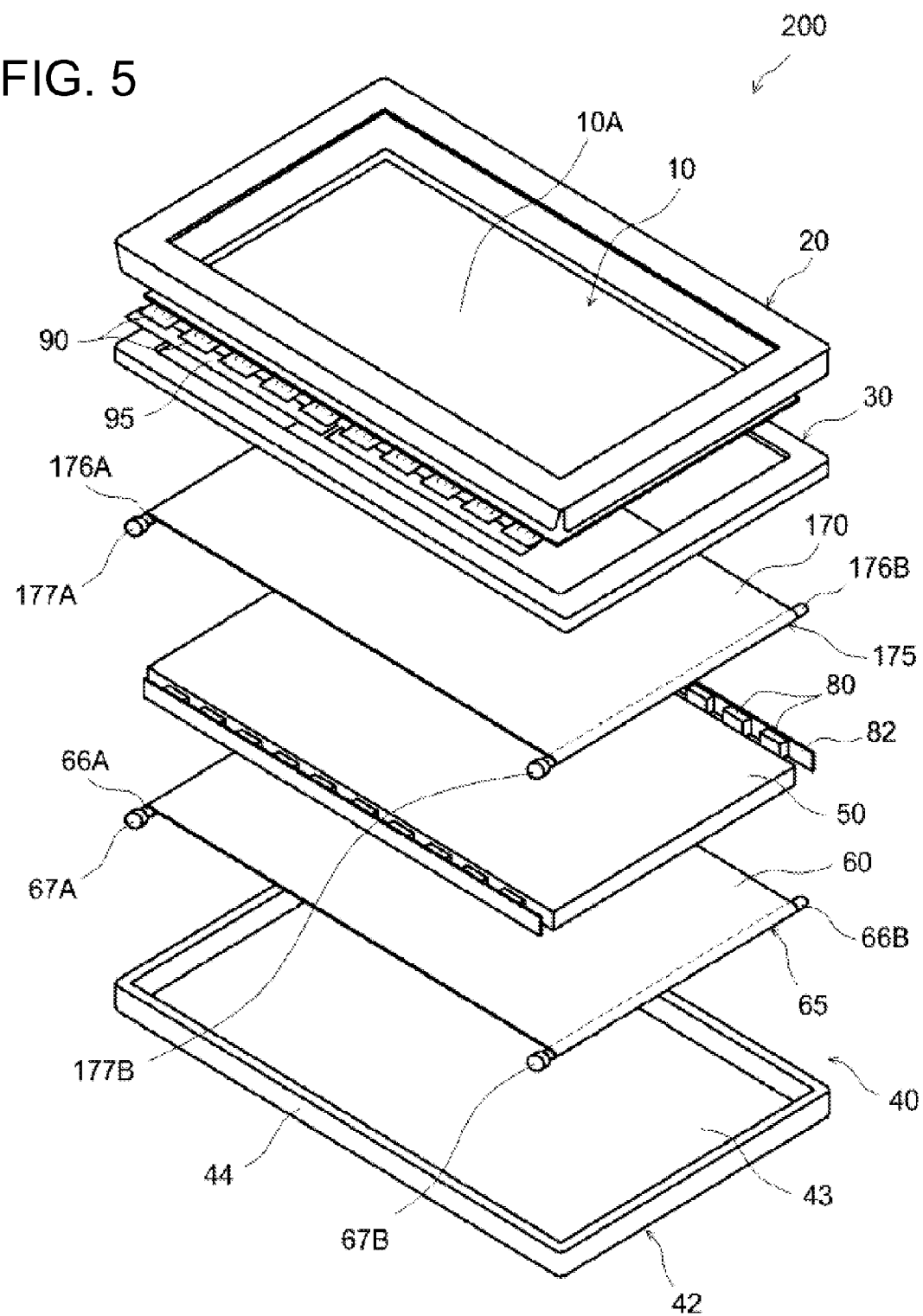
FIG. 5 is an exploded perspective view that schematically shows a structure of a liquid crystal display device of another embodiment.
Figure 6:
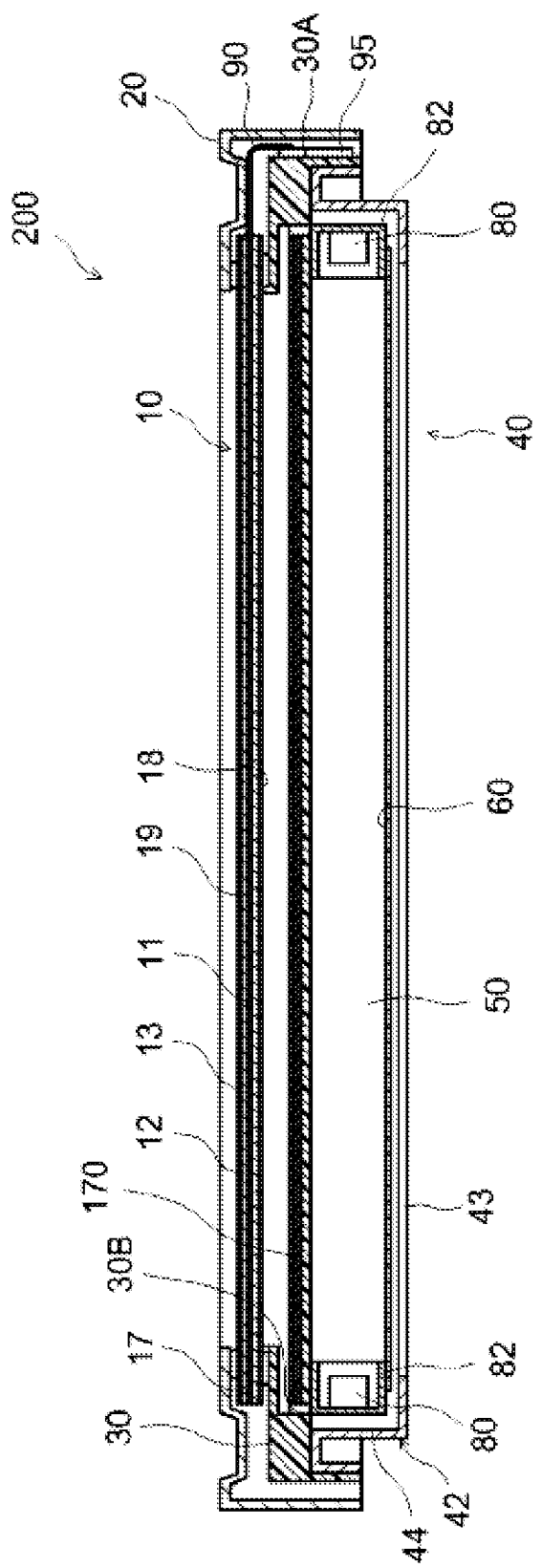
FIG. 6 is a cross-sectional view that schematically shows a structure of a liquid crystal display device of another embodiment.
Figure 7:
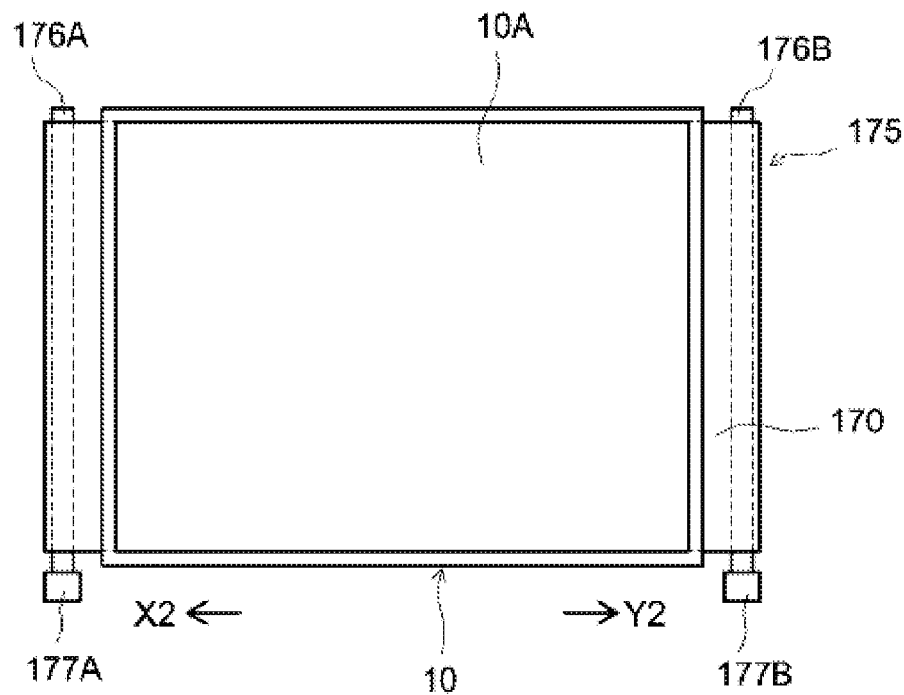
FIG. 7 is a front view schematically shows a structure of a liquid crystal display panel and an optical sheet moving unit of another embodiment.
Figure 8:
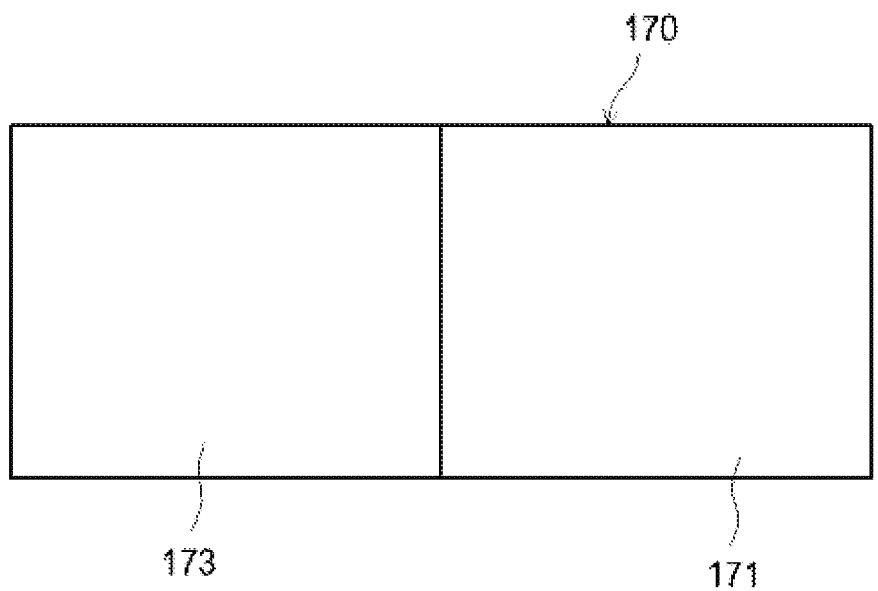
FIG. 8 is a plan view that schematically shows a structure of an optical sheet of another embodiment.

Next, with reference to FIGS. 5 to 8, Embodiment 2 will be explained. FIG. 5 is an exploded perspective view that schematically shows a structure of a liquid crystal display device 200 of the present embodiment. FIG. 6 is a cross-sectional view that schematically shows a structure of the liquid crystal display device 200 of the present embodiment. FIG. 7 is a front view that schematically shows a structure of the liquid crystal display panel 10 and an optical sheet moving unit 175 of the present embodiment. FIG. 8 is a plan view that schematically shows a structure of an optical sheet 170 of the present embodiment. In FIG. 7, the bezel 20 or the chassis 42 is not shown for simplification.

As shown in FIGS. 5 and 6, in the liquid crystal display device 200 of the present embodiment, an optical sheet 170 is provided between the liquid crystal display panel 10 and the light guide plate 50 (typically, on the surface of the light guide plate 50). The optical sheet 170 is provided so as to be able to move behind the display region 10A of the liquid crystal display panel 10 in synchronization with a positional change of the reflective sheet 60.

As shown in FIGS. 5 and 7, the optical sheet 170 is formed to be large enough to completely cover the display region 10A of the liquid crystal display panel 10, and is disposed between the liquid crystal display panel 10 and the light guide plate 50. As shown in FIG. 8, the optical sheet 170 is formed in a band shape, and has an angle deflection portion 171 and a transparent portion 173. The angle deflection portion 171 changes the angle of light emitted from the light guide plate 50, and emits the light to the liquid crystal display panel 10. The transparent portion 173 has a relatively high light transmittance of light emitted from the light guide plate 50. The angle deflection portion 171 and the transparent portion 173 of the optical sheet 170 are formed in regions that respectively correspond to the reflective portion 61 and the transmissive portion 63 of the reflective sheet 60, when the optical sheet 170 is superimposed on the reflective sheet 60. It is preferable that each of the angle deflection portion 171 and the transparent portion 173 have an area that is equal to or greater than the display region 10A of the liquid crystal display panel 10. With this configuration, it is possible to cover the entire area behind the display region 10A of the liquid crystal display panel 10 with the angle deflection portion 171 or the transparent portion 173. The angle deflection portion 171 and the transparent portion 173 of the present embodiment respectively have an area greater than that of the display region 10A of the liquid crystal display panel 10.

The angle deflection portion 171 is made of at least one sheet-shaped optical member. Examples of the sheet-shaped optical member include a diffusion sheet, a lens sheet, and a brightness enhancement sheet. The angle deflection portion 171 is made by laminating a plurality of sheet-shaped optical members, for example, and a diffusion sheet, a lens sheet, and a brightness enhancement sheet are disposed in this order from the light guide plate 50 side to the liquid crystal display panel 10. There is no special limitation on the material to form the transparent portion 173 as long as it absorbs and diffuses little light and has a high transmittance. Examples of the material include polyethylene terephthalate (PET), polyethylene (PE), and polypropylene (PP). The transparent portion 173 may be formed by cutting out a portion of the angle deflection portion 171. When the angle deflection portion 171 is made by stacking a plurality of sheet-shaped optical members, it is preferable to form the transparent portion 173 to the same thickness as that of the angle deflection portion 171.

As shown in FIGS. 5 and 7, the optical sheet moving unit 175 movably holds the optical sheet 170, and has roll-up spindles 176A and 176B that can roll up respective ends of the optical sheet 170 in a prescribed direction (typically, longitudinal direction or shorter side direction; in this embodiment, longitudinal direction). The optical sheet roll-up spindles 176A and 176B are disposed near the respective ends of the liquid crystal display panel 10 in the longitudinal direction. At one end of the optical sheet roll-up spindle 176A, an electric motor 177A is provided as a driving source for driving the roll-up spindle 176A. Similarly, at one end of the optical sheet roll-up spindle 176B, an electric motor 177B is provided. It is preferable to use electric motors that can drive in both forward and reverse directions as the electric motors 177A and 177B. The optical sheet moving unit 175 (optical sheet roll-up spindles 176A and 176B and electric motors 177A and 177B) is housed in the frame 30, and is fixed to each inner side wall portion 30B of the frame 30, or the optical sheet moving unit 175 is housed in the chassis 42, and is fixed to each side wall portion 44 of the chassis 42.

Next, a typical example of moving the optical sheet 170 in the liquid crystal display device 200 disclosed herein will be explained.

As shown in FIG. 7, both ends of the optical sheet 170 in the longitudinal direction are respectively attached to the optical sheet roll-up spindles 176A and 176B. Here, the angle deflection portion 171 of the optical sheet 170 is positioned so as to correspond to the front side of the reflective portion 61 of the reflective sheet 60. The transparent portion 173 is positioned so as to correspond to the front side of the transmissive portion 63 of the reflective sheet 60. The optical sheet 170 is moved by the optical sheet moving unit 175 in synchronization with the positional change (move) of the reflective sheet 60. That is, of the electric motors 177A and 177B, at least the electric motor 177A is driven in the forward direction in synchronization with (that is, at the same time as) the forward drive of the electric motor 67A (see FIG. 5), thereby rotating the optical sheet roll-up spindle 176A in the forward direction. As a result, the optical sheet 170 is rolled up by the roll-up spindle 176A, and is moved in the direction of the arrow X2 of FIG. 7. With the move of the optical sheet 170, the positions of the angle deflection portion 171 and the transparent portion 173 are changed behind the display region 10A of the liquid crystal display panel 10. As a result, the angle deflection portion 171 of the optical sheet 170 is moved to a position that corresponds to the front side of the reflective portion 61 of the reflective sheet 60, and the transparent portion 173 is moved to a position that corresponds to the front side of the transmissive portion 63 of the reflective sheet 60. For example, by continuously moving the reflective sheet 60 and the optical sheet 170 in the direction of the arrow X2, only the reflective portion 61 and the angle deflection portion 171 can be disposed behind the display region 10A. As described, by moving the reflective sheet 60 and the optical sheet 170 in synchronization with each other, only the reflective portion 61 and the angle deflection portion 171 can be placed behind the display region 10A. As a result, in the entire display region 10A of the liquid crystal display panel 10, the light utilization efficiency can be further improved, and higher-quality image display is achieved.

On the other hand, of the electric motors 177A and 177B, at least the electric motor 177B is driven in the reverse direction in synchronization with (that is, at the same time as) the reverse drive of the electric motor 67B, thereby rotating the optical sheet roll-up spindle 176B in the reverse direction. As a result, the optical sheet 170 is rolled up by the roll-up spindle 176B, and is moved in the direction of the arrow Y2 of FIG. 7. With the move of the optical sheet 170, the positions of the angle deflection portion 171 and the transparent portion 173 are changed behind the display region 10A of the liquid crystal display panel 10. As a result, the angle deflection portion 171 of the optical sheet 170 is moved to a position that corresponds to the front side of the reflective portion 61 of the reflective sheet 60, and the transparent portion 173 is moved to a position that corresponds to the front side of the transmissive portion 63 of the reflective sheet 60. For example, by continuously moving the reflective sheet 60 and the optical sheet 170 in the direction of the arrow Y2, it is possible to dispose only the transmissive portion 63 and the transparent portion 173 behind the display region 10A. As described, by moving the reflective sheet 60 and the optical sheet 170 in synchronization with each other, only the transmissive portion 63 and the transparent portion 173 can be disposed behind the display region 10A. This makes it possible to remove a part with a low transparency (that is, the reflective portion 61 and the angle deflection portion 171) from the entire display region 10A of the liquid crystal display panel 10. Therefore, in the entire display region 10A, an object placed behind the liquid crystal display device 200 can be viewed.

In the optical sheet moving unit 175 of the present embodiment, the optical sheet roll-up spindles 176A and 176B are provided at respective ends of the optical sheet 170 in the longitudinal direction (horizontal direction) such that the optical sheet 170 can be moved in the longitudinal direction (that is, the longitudinal direction of the liquid crystal display panel 10). Alternatively, when the reflective sheet 60 can be moved in the shorter side direction of the sheet 60 (that is, the shorter side direction of the liquid crystal display panel), the optical sheet moving unit 175 may be configured to have optical sheet roll-up spindles on respective ends in the shorter side direction (vertical direction) of the optical sheet 170 such that the optical sheet 170 can be moved in the shorter side direction (that is, the shorter side direction of the liquid crystal display panel).

Figure 9:
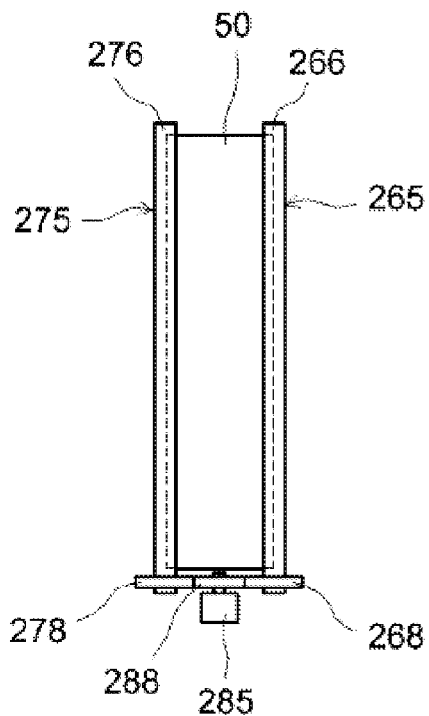
FIG. 9 is a side view that schematically shows an area around a driving source of another embodiment.

Next, with reference to FIG. 9, Embodiment 3 will be explained. FIG. 9 is a side view that schematically shows an area around an electric motor (driving source) 285 of Embodiment 3. Although this figure shows one side face of the light guide plate 50, an electric motor and the like that have a similar configuration is provided on the other side face of the light guide plate 50.

As shown in FIG. 9, a reflective sheet moving unit 265 and an optical sheet moving unit 275 of the present embodiment have an electric motor 285 as a common driving source between a reflective sheet roll-up spindle 266 and an optical sheet roll-up spindle 276 and in the vicinity of the light guide plate 50. The reflective sheet moving unit 265 includes a reflective sheet roll-up spindle 266 that can roll up the end of the reflective sheet 60 (see FIG. 4) in the longitudinal direction. At one end of the reflective sheet roll-up spindle 266, a first gear 268 is attached so as to engage with a gear 288 of the electric motor 285. The optical sheet moving unit 275 includes an optical sheet roll-up spindle 276 that can roll up the end of the optical sheet 170 (see FIG. 8) in the longitudinal direction. At one end of the optical sheet roll-up spindle 276, a second gear 278 is attached so as to engage with the gear 288 of the electric motor 285.

With this configuration, by driving the common electric motor 285 in the forward and reverse directions, the reflective sheet 60 and the optical sheet 170 can be simultaneously moved, and the positions thereof can be changed. When the reflective sheet 60 and the optical sheet 170 are moved in the shorter side direction, a similar configuration can be employed to move the sheets 60 and 170 and change the positions thereof simultaneously.

Figure 10:
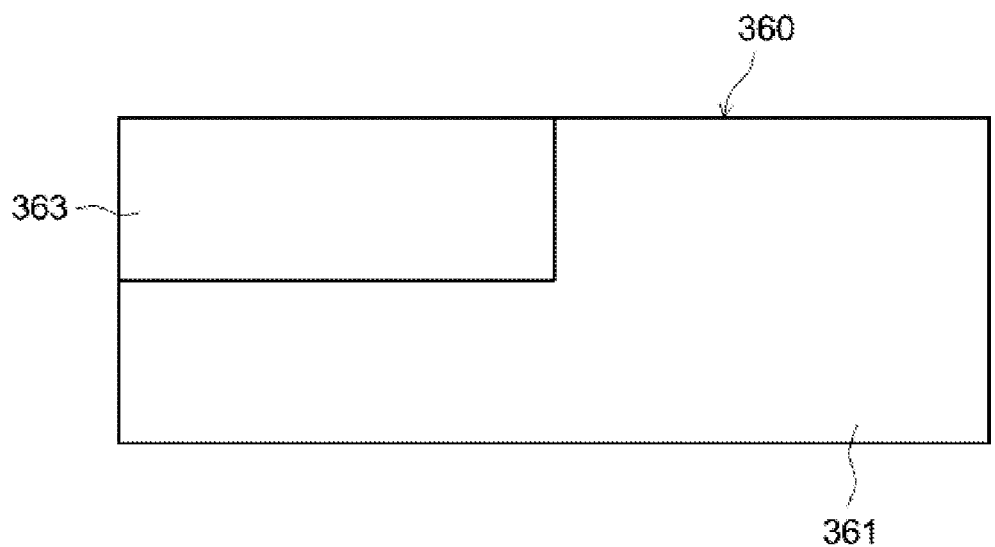
FIG. 10 is a plan view that schematically shows a structure of a reflective sheet of another embodiment.

Next, Embodiment 4 will be explained with reference to FIG. 10. FIG. 10 is a plan view that schematically shows a structure of a reflective sheet 360 of Embodiment 4.

The reflective sheet 360 of the present embodiment is formed to be large enough to completely cover the display region of the liquid crystal display panel 10 (see FIG. 2). As shown in FIG. 10, the reflective sheet 360 is formed in a band shape, and has a reflective portion 361 and a transmissive portion 363. The reflective portion 361 reflects light emitted from the light guide plate 50 (see FIG. 2) back to the light guide plate 50 with a relatively high reflectance. In the transmissive portion 363, the reflectance is relatively low, or the light is not reflected, while a transmittance of light emitted from the light guide plate 50 is relatively high. The transmissive portion 363 of the present embodiment is formed in a top half of the left side region of the reflective sheet 360. The region where the transmissive portion 363 is formed is not limited to the above-mentioned region, and the transmissive portion 363 may be formed in any appropriate region in the reflective sheet 360.

With this configuration, by moving the reflective sheet 360, the reflective portion 361 and the transmissive portion 363 can be disposed in appropriate positions behind the display region 10A of the liquid crystal display panel 10. As a result, high-quality image display can be achieved in the region where the reflective portion 361 is disposed, and in the region where the transmissive portion 363 is disposed, an object placed behind the display panel 10 can be viewed. When using an optical sheet, the optical sheet is configured such that an angle deflection portion is formed in a position that corresponds to the reflective portion 361 of the reflective sheet 360 and such that a transparent portion is formed in a position that corresponds to the transmissive portion 363. Because the reflective sheet 360 and the optical sheet are moved in synchronization with each other, high-quality image display can be performed in the region where the reflective portion 361 and the angle deflection portion are disposed, and in the region where the transmissive portion 363 and the transparent portion are disposed, an object placed in the rear can be viewed.

Figure 11:
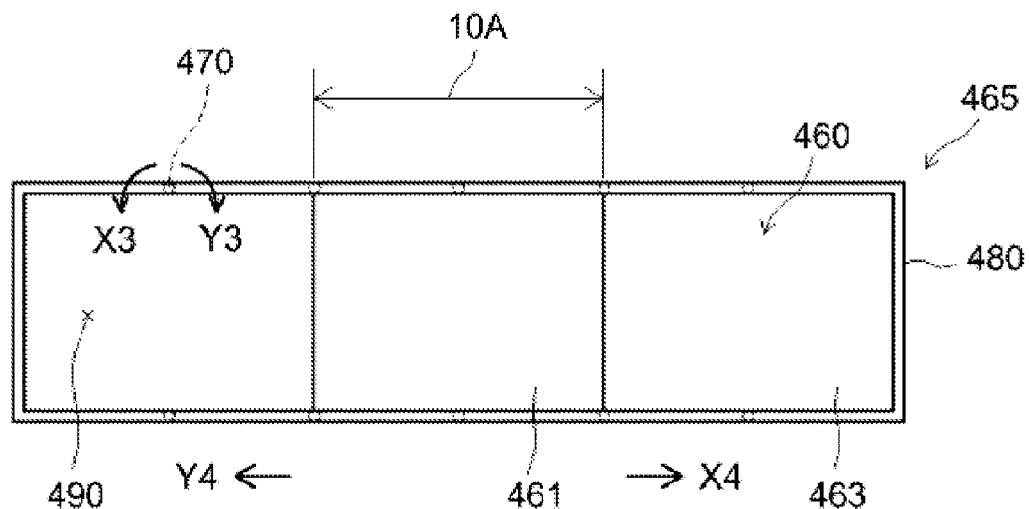
FIG. 11 is a front view that schematically shows a structure of a reflective sheet moving unit of another embodiment.
Figure 12:
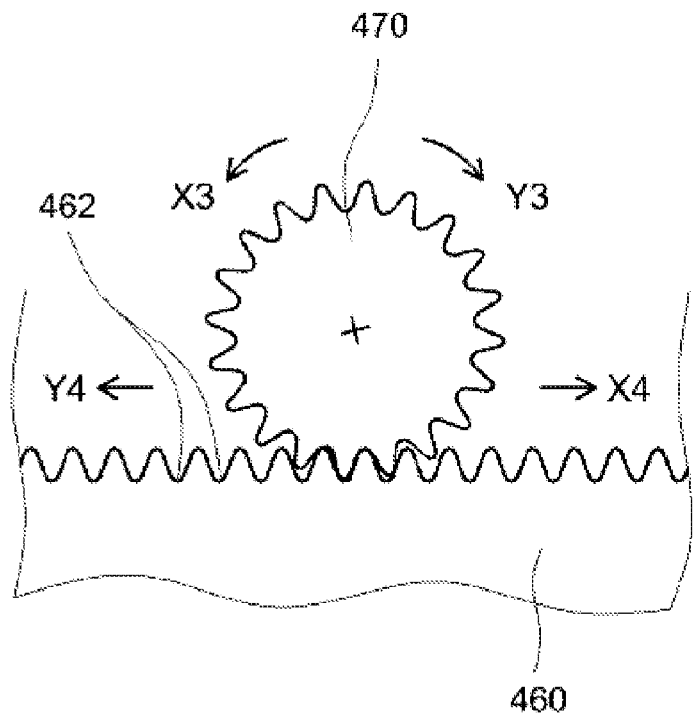
FIG. 12 is an enlarged front view that shows a main part of a reflective sheet moving unit of another embodiment.

Next, with reference to FIGS. 11 and 12, Embodiment 5 will be explained. FIG. 11 is a front view that schematically shows a structure of a reflective sheet moving unit 465 of the present embodiment. FIG. 12 is an enlarged front view of a main portion of the reflective sheet moving unit 465 of the present embodiment.

The reflective sheet moving unit 465 of the present embodiment includes a frame portion 480 that is formed in a rectangular frame shape as a whole, and an opening 490 thereof is three times larger than the size of the display region 10A of the liquid crystal display panel 10 (see FIG. 1). When the opening 490 of the frame portion 480 is divided into three in the longitudinal direction, the center portion corresponds to the display region 10A of the liquid crystal display panel 10. In the center portion, the liquid crystal panel 10, the light guide plate 50 (see FIG. 1), and the like are disposed, and by being assembled by the bezel 20 (see FIG. 1) or the like, these members are held as one component.

In the longitudinal direction of the frame portion 480 of the reflective sheet moving unit 465, a plurality of gears 470 are provided in positions that are opposite to each other. The gears 470 hold a reflective sheet 460, which will be later described, so as to be able to move, and the gears 470 can engage with edges 462 with recesses and protrusions of the reflective sheet 460. The gears 470 are connected to a not-shown driving source (electric motor, for example), and can be driven in the forward direction (the direction of the arrow X3 of FIGS. 11 and 12) and in the reverse direction (the direction of the arrow Y3 of FIGS. 11 and 12). As shown in FIGS. 11 and 12, the reflective sheet 460 of the present embodiment is formed in a quadrangle shape (rectangular shape, for example), and has edges 462 with recesses and protrusions at respective edges on the opposite longer sides of the sheet 460. Further, the reflective sheet 460 has a reflective portion 461 and a transmissive portion 463. The reflective portion 461 reflects light emitted from the light guide plate 50 (see FIG. 2) back to the light guide plate 50 with a relatively high reflectance. In the transmissive portion 463, the reflectance is relatively low, or the light is not reflected, while transmittance of light emitted from the light guide plate 50 is relatively high. The edge 462 with recesses and protrusions may be formed on at least one side of the reflective sheet 460.

By driving the gears 470 in the forward direction (direction of the arrow X3 of FIGS. 11 and 12), the reflective sheet 460 is moved within the frame portion 480 in a direction in which the edge 462 with recesses and protrusions is extended (that is, the direction of the arrow X4 of FIGS. 11 and 12). This makes it possible to change the positions of the reflective portion 461 and the transmissive portion 463 behind the display region 10A of the liquid crystal display panel 10. By moving the reflective sheet 460 in the direction of the arrow X4 until the end of the reflective sheet 460 reaches the end of the frame portion 480, only the reflective portion 461 can be disposed behind the display region 10A. On the other hand, by driving the gears 470 in the reverse direction (direction of the arrow Y3 of FIGS. 11 and 12), the reflective sheet 460 is moved within the frame portion 480 in a direction in which the edge 462 with recesses and protrusions is extended (that is, the direction of the arrow Y4 of FIGS. 11 and 12). This makes it possible to change the positions of the reflective portion 461 and the transmissive portion 463 behind the display region 10A of the liquid crystal display panel 10. By moving the reflective sheet 460 in the direction of the arrow Y4 until the end of the reflective sheet 460 reaches the end of the frame portion 480, only the transmissive portion 463 can be disposed behind the display region 10A. With this configuration, effects similar to those of Embodiment 1 can be obtained. When using an optical sheet, by disposing an optical sheet moving unit that has a configuration similar to that of the reflective sheet moving unit 465 between the liquid crystal display panel 10 and the light guide plate 50, effects similar to those of Embodiment 2 can be obtained.

Figure 13:
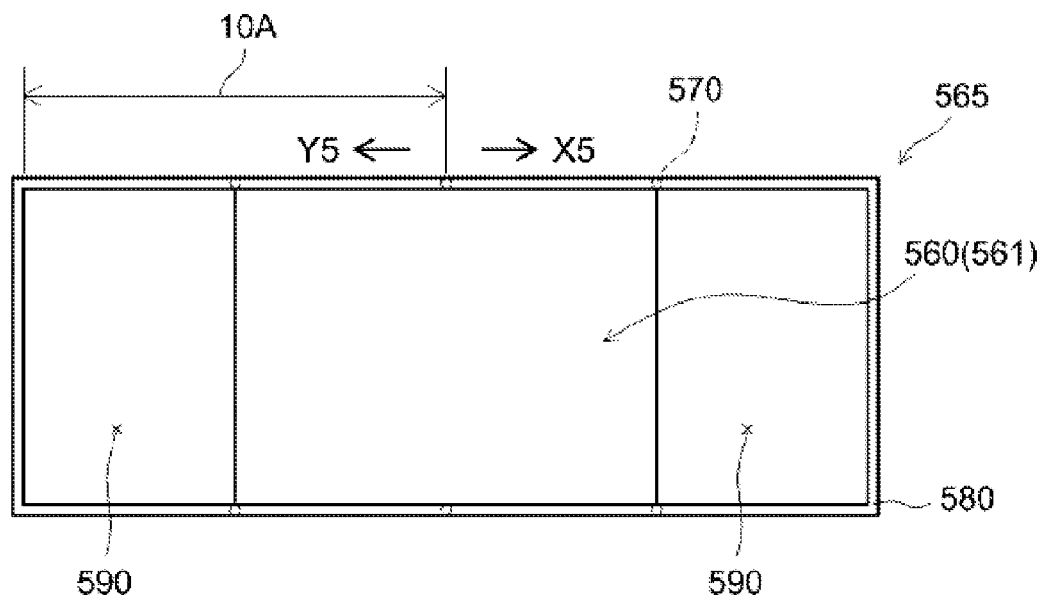
FIG. 13 is a front view that schematically shows a structure of a reflective sheet moving unit of another embodiment.

Next, Embodiment 6 will be explained with reference to FIG. 13. FIG. 13 is a front view that schematically shows a structure of a reflective sheet moving unit 565 of the present embodiment.

The reflective sheet moving unit 565 of the present embodiment includes a frame portion 580 that is formed in a rectangular frame shape as a whole, and an opening 590 thereof is twice as large as the size of the display region 10A of the liquid crystal display panel 10 (see FIG. 1). As shown in FIG. 13, when the opening 590 of the frame portion 580 is divided into two in the longitudinal direction, the left half is the display region 10A of the liquid crystal display panel. The liquid crystal display panel 10, the light guide plate 50 (see FIG. 1), and the like are disposed in this portion, and by being assembled by the bezel 20 (see FIG. 1) or the like, these members are held as one component. The reflective sheet 560 is constituted of a reflective portion 561 that reflects light emitted from the light guide plate 50 (see FIG. 2) back to the light guide plate 50. The reflective sheet 560 also has recesses and protrusions (not shown) along the edges on the respective opposite longer sides of the sheet 560.

By driving the gears 570 in the forward direction, the reflective sheet 560 is moved within the frame portion 580 (opening 590) in the direction of the arrow X5 of FIG. 13, and the position of the reflective portion 561 behind the display region 10A of the liquid crystal display panel 10 can be changed. When the reflective sheet 560 is moved in the direction of the arrow X5 until the end of the reflective sheet 560 reaches the end of the frame portion 580 (end that is further away from the display region), the reflective sheet 560 (that is, the reflective portion 561) is not disposed behind the display region 10A. As a result, a part with a low transparency does not exist in the entire display region 10A of the liquid crystal display panel 10, and an object placed behind the liquid crystal display device can be viewed.

On the other hand, by driving the gears 570 in the reverse direction, the reflective sheet 560 is moved within the frame portion 580 in the direction of the arrow Y5 of FIG. 13. When the reflective sheet 560 is moved in the direction of the arrow Y5 until the end of the reflective sheet 560 reaches the end of the frame portion 580 (end near the display region), only the reflective sheet 560 (that is, the reflective portion 561) is disposed behind the display region 10A. As a result, light utilization efficiency can be increased in the entire display region 10A of the liquid crystal display panel 10, and the quality of image display can be improved.

Figure 14:
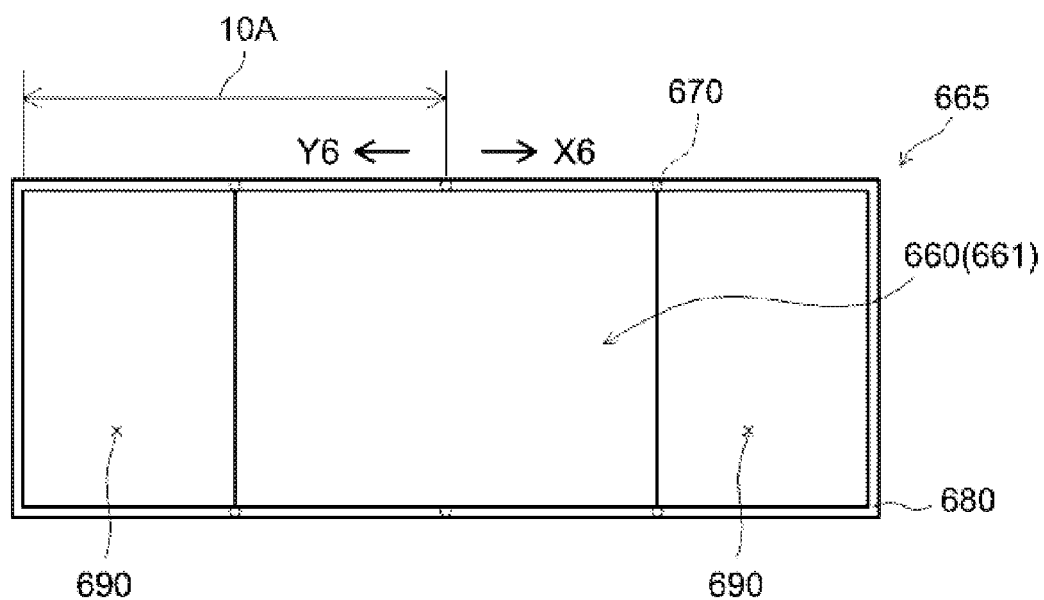
FIG. 14 is a front view that schematically shows a structure of an optical sheet moving unit of another embodiment.

Next, Embodiment 7 will be explained with reference to FIG. 14. FIG. 14 is a front view that schematically shows a structure of an optical sheet moving unit 665 of the present embodiment.

The optical sheet moving unit 665 of the present embodiment is disposed between the liquid crystal display panel 10 (see FIG. 1) and the light guide plate 50 (see FIG. 1), and has a configuration similar to that of the reflective sheet moving unit 565 (see FIG. 13). An optical sheet 660 of the present embodiment is constituted of an angle deflection portion 661 that changes an angle of light emitted from the light guide plate 50, and emits the light to the liquid crystal display panel 10. The optical sheet 660 also has recesses and protrusions (not shown) along the edges on the respective opposite longer sides of the sheet 660.

The optical sheet 660 is moved by the optical sheet moving unit 665 in synchronization with the move of the reflective sheet 560 (see FIG. 13). That is, by driving gears 670 of the optical sheet moving unit in the forward direction in synchronization with the drive of the gears 570 (see FIG. 13) of the reflective sheet moving unit, the optical sheet 660 is moved within the frame portion 680 (opening 690) in the direction of the arrow X6 of FIG. 14. As a result, the position of the angle deflection portion 661 can be changed behind the display region 10A of the liquid crystal display panel 10. The angle deflection portion 661 is disposed in a position that corresponds to the front side of the reflective portion 561. When the reflective sheet 560 is moved in the direction of the arrow X5 until the end of the reflective sheet 560 reaches the end of the frame portion 580, the end of the optical sheet 660 is also moved to the end of the frame portion 680, and the reflective sheet 560 (that is, the reflective portion 561) or the optical sheet 660 (that is, the angle deflection portion 661) is not disposed behind the display region 10A. As a result, a part with a low transparency does not exist in the entire display region 10A of the liquid crystal display panel 10, and an object placed behind the liquid crystal display device can be viewed.

On the other hand, by driving the gears 670 in the reverse direction in synchronization with the reverse drive of the gears 570, the optical sheet 660 can be moved in the direction of the arrow Y6, and as a result, the position of the angle deflection portion 661 behind the display region 10A of the liquid crystal display panel 10 can be changed. The angle deflection portion 661 is disposed in a position that corresponds to the front side of the reflective portion 561. When the reflective sheet 560 is moved in the direction of the arrow Y5 until the end of the reflective sheet 560 reaches the end of the frame portion 580, the end of the optical sheet 660 is also moved to the end of the frame portion 680, and only the reflective sheet 560 (that is, the reflective portion 561) and the optical sheet 660 (that is, the angle deflection portion 661) can be disposed behind the display region 10A. As a result, the light utilization efficiency can be increased in the entire display region 10A of the liquid crystal display panel 10, and the quality of image display can be improved.

Specific examples of the present invention were described above in detail with reference to the figures, but these specific examples are illustrative, and not limiting the scope of the claims. The technical scope defined by the claims includes various modifications of the specific examples described above.

For example, the reflective sheet moving unit may be disposed on the rear surface side of the backlight device and fixed to an outer cabinet that houses the liquid crystal display device, and the like.

INDUSTRIAL APPLICABILITY

According to the present invention, it is possible to provide a liquid crystal display device that can freely change the positions of an image display region and a region in which an object placed behind the liquid crystal display device can be viewed in a liquid crystal display panel.

DESCRIPTION OF REFERENCE CHARACTERS

10 liquid crystal display panel
10A display region
11 array substrate
12 color filter substrate (CF substrate)
13 liquid crystal layer
17 sealing member
18, 19 polarizing plate
20 bezel (frame member)
30 frame
30A outer side face
30B inner side face
40 backlight device
42 chassis
43 bottom surface
44 side wall 50 light guide plate
60 reflective sheet
61 reflective portion
63 transmissive portion
65 reflective sheet moving unit
66A, 66B reflective sheet roll-up spindle
67A, 67B electric motor
80 light source
82 reflector
90 flexible printed circuit (FPC)
95 printed board
100 liquid crystal display device
170 optical sheet
171 angle deflection portion
173 transparent portion
175 optical sheet moving unit
176A, 176B optical sheet roll-up spindle
177A, 177B electric motor
200 liquid crystal display device
265 reflective sheet moving unit
266 reflective sheet roll-up spindle
268 first gear
275 optical sheet moving unit
276 optical sheet roll-up spindle
278 second gear
285 electric motor
288 gear
360 reflective sheet
361 reflective portion
363 transmissive portion
460 reflective sheet
461 reflective portion
462 edge with recesses and protrusions
463 transmissive portion
465 reflective sheet moving unit
470 gear
480 frame portion
490 opening
560 reflective sheet
561 reflective portion
565 reflective sheet moving unit
570 gear
580 frame portion
590 opening
660 optical sheet
661 angle deflection portion
665 optical sheet moving unit
670 gear
680 frame portion
690 opening

The invention claimed is:

1. A liquid crystal display device, comprising:
a liquid crystal display panel;
a light guide plate disposed on a rear surface side of the liquid crystal display panel;
a light source disposed on a side face of the light guide plate, the light source emitting light to a display region of the liquid crystal display panel through the light guide plate;
a reflective sheet disposed on a rear surface side of the light guide plate; and
a reflective sheet moving unit that moves and holds the reflective sheet;
wherein the reflective sheet has a reflective portion and a transmissive portion, the reflective portion having a reflectance in reflecting light emitted from the light guide plate back to the light guide plate, the transmissive portion being made of a material that has a reflectance lower than said reflectance of the reflective portion or that does not reflect the light and having a transmittance for light emitted from the light guide plate,
wherein the reflective sheet moving unit moves positions of the reflective portion and the transmissive portion behind the display region of the liquid crystal display panel,
wherein the reflective sheet is formed in a quadrangular shape, and an edge on at least one side of said sheet has recesses and protrusions, and
wherein the reflective sheet moving unit has a gear that engages with the recesses and protrusions on the edge, and by rotating the gear, the reflective sheet is moved in a direction in which the edge with the recesses and protrusions is extended, thereby changing positions of the reflective portion and the transmissive portion behind the display region of the liquid crystal display panel.

2. The liquid crystal display device according to claim 1, wherein each of the reflective portion and the transmissive portion of the reflective sheet has an area equal to or greater than an area of the display region of the liquid crystal display panel, and
wherein the reflective sheet moving unit switches positions of the reflective portion and the transmissive portion behind the display region of the liquid crystal display panel.

3. A liquid crystal display device, comprising:
a liquid crystal display panel;
a light guide plate disposed on a rear surface side of the liquid crystal display panel;
a light source disposed on a side face of the light guide plate, the light source emitting light to a display region of the liquid crystal display panel through the light guide plate;
a reflective sheet disposed on a rear surface side of the light guide plate;
a reflective sheet moving unit that moves and holds the reflective sheet;
at least one optical sheet; and
an optical sheet moving unit that moves and holds the optical sheet, the optical sheet moving unit being disposed between the liquid crystal display panel and the light guide plate,
wherein the optical sheet moving unit changes a position of the optical sheet in synchronization with a positional change of the reflective sheet,
wherein the reflective sheet has a reflective portion and a transmissive portion, the reflective portion having a reflectance in reflecting light emitted from the light guide plate back to the light guide plate, the transmissive portion being made of a material that has a reflectance lower than said reflectance of the reflective portion or that does not reflect the light and having a transmittance for light emitted from the light guide plate,
wherein the optical sheet has an angle deflection portion and a transparent portion, the angle deflection portion changing an angle of light emitted from the light guide plate and emitting the light to the liquid crystal display panel, the transparent portion having a transmittance for light emitted from the light guide plate, and
wherein the optical sheet moving unit is configured such that the angle deflection portion is located in a position corresponding to a front side of the reflective portion of the reflective sheet and such that the transparent portion is located in a position corresponding to a front side of the transmissive portion of the reflective sheet, and the optical sheet moving unit moves positions of the angle deflection portion and the transparent portion in synchronization with positional changes of the reflective portion and the transmissive portion.

4. The liquid crystal display device according to claim 3, wherein the reflective sheet has a reflective portion and a transmissive portion, the reflective portion having a reflectance in reflecting light emitted from the light guide plate back to the light guide plate, the transmissive portion being made of a material that has a reflectance lower than said reflectance of the reflective portion or that does not reflect the light and having a transmittance for light emitted from the light guide plate, and
wherein the reflective sheet moving unit moves positions of the reflective portion and the transmissive portion of the reflective sheet behind the display region of the liquid crystal display panel.

5. The liquid crystal display device according to claim 4, wherein each of the reflective portion and the transmissive portion of the reflective sheet has an area equal to or greater than an area of the display region of the liquid crystal display panel, and
wherein the reflective sheet moving unit switches positions of the reflective portion and the transmissive portion of the reflective sheet behind the display region of the liquid crystal display panel.

6. A liquid crystal display device, comprising:
a liquid crystal display panel;
a light guide plate disposed on a rear surface side of the liquid crystal display panel;
a light source disposed on a side face of the light guide plate, the light source emitting light to a display region of the liquid crystal display panel through the light guide plate;
a reflective sheet disposed on a rear surface side of the light guide plate;
a reflective sheet moving unit that moves and holds the reflective sheet;
at least one optical sheet; and
an optical sheet moving unit that moves and holds the optical sheet, the optical sheet moving unit being disposed between the liquid crystal display panel and the light guide plate,
wherein the optical sheet moving unit changes a position of the optical sheet in synchronization with a positional change of the reflective sheet,
wherein the optical sheet has an angle deflection portion and a transparent portion, the angle deflection portion changing an angle of light emitted from the light guide plate and emitting the light to the liquid crystal display panel, the transparent portion having a transmittance for light emitted from the light guide plate,
wherein the optical sheet is formed to be large enough to completely cover the display region of the liquid crystal display panel,
wherein the optical sheet moving unit includes roll-up spindles that roll up two ends of the optical sheet in a prescribed direction, and
wherein, by rotating each of the roll-up spindles, the optical sheet is moved in the prescribed direction, and positions of the angle deflection portion and the transparent portion behind the display region of the liquid crystal display panel are changed.

7. The liquid crystal display device according to claim 6, wherein the reflective sheet has a reflective portion and a transmissive portion, the reflective portion having a reflectance in reflecting light emitted from the light guide plate back to the light guide plate, the transmissive portion being made of a material that has a reflectance lower than said reflectance of the reflective portion or that does not reflect the light and having a transmittance for light emitted from the light guide plate, and
wherein the reflective sheet moving unit moves positions of the reflective portion and the transmissive portion of the reflective sheet behind the display region of the liquid crystal display panel.

8. The liquid crystal display device according to claim 7, wherein the reflective sheet is formed to be large enough to completely cover the display region of the liquid crystal display panel,
wherein the reflective sheet moving unit includes roll-up spindles that roll up two ends of the reflective sheet in a prescribed direction, and
wherein, by rotating each of the roll-up spindles, the reflective sheet is moved in the prescribed direction, and positions of the reflective portion and the transmissive portion of the reflective sheet behind the display region of the liquid crystal display panel are changed.

9. The liquid crystal display device according to claim 8, wherein the reflective sheet moving unit and the optical sheet moving unit are driven by a same driving source.

10. A liquid crystal display device according, comprising:
a liquid crystal display panel;
a light guide plate disposed on a rear surface side of the liquid crystal display panel;
a light source disposed on a side face of the light guide plate, the light source emitting light to a display region of the liquid crystal display panel through the light guide plate;
a reflective sheet disposed on a rear surface side of the light guide plate;
a reflective sheet moving unit that moves and holds the reflective sheet;
at least one optical sheet; and
an optical sheet moving unit that moves and holds the optical sheet, the optical sheet moving unit being disposed between the liquid crystal display panel and the light guide plate,
wherein the optical sheet moving unit changes a position of the optical sheet in synchronization with a positional change of the reflective sheet,
wherein the optical sheet has an angle deflection portion and a transparent portion, the angle deflection portion changing an angle of light emitted from the light guide plate and emitting the light to the liquid crystal display panel, the transparent portion having a transmittance for light emitted from the light guide plate,
wherein the optical sheet is formed in a quadrangular shape, and an edge on at least one side of said sheet has recesses and protrusions, and
wherein the optical sheet moving unit has a gear that engages with the recesses and protrusions on the edge, and by rotating the gear, the optical sheet is moved in a direction in which the edge with the recesses and protrusions is extended, thereby changing positions of the angle deflection portion and the transparent portion behind the display region of the liquid crystal display panel.

11. The liquid crystal display device according to claim 10, wherein the reflective sheet has a reflective portion and a transmissive portion, the reflective portion having a reflectance in reflecting light emitted from the light guide plate back to the light guide plate, the transmissive portion being made of a material that has a reflectance lower than said reflectance of the reflective portion or that does not reflect the light and having a transmittance for light emitted from the light guide plate, and wherein the reflective sheet moving unit moves positions of the reflective portion and the transmissive portion of the reflective sheet behind the display region of the liquid crystal display panel.

12. The liquid crystal display device according to claim 11, wherein the reflective sheet is formed in a quadrangular shape, and an edge on at least one side of said sheet has recesses and protrusions, and wherein the reflective sheet moving unit has a gear that engages with the recesses and protrusions on the edge, and by rotating the gear, the reflective sheet is moved in a direction in which the edge with the recesses and protrusions is extended, thereby changing positions of the reflective portion and the transmissive portion of the reflective sheet behind the display region of the liquid crystal display panel.

\* \* \* \* \*